US007857003B2

(12) United States Patent
Groen et al.

(10) Patent No.: US 7,857,003 B2
(45) Date of Patent: Dec. 28, 2010

(54) SELECTABLE DETENT ASSEMBLY WITH NEUTRAL PROTECTION

(75) Inventors: Ronald D. Groen, Easley, SC (US); Matthew Schultz, Easley, SC (US); Gary P. Pittman, Easley, SC (US); Craig A. Wilson, Anderson, SC (US)

(73) Assignee: Sauder-Danfoss Inc., Ames, IA (US)

( * ) Notice: Subject to any disclaimer, the term of this patent is extended or adjusted under 35 U.S.C. 154(b) by 463 days.

(21) Appl. No.: 12/056,476

(22) Filed: Mar. 27, 2008

(65) Prior Publication Data

US 2009/0242054 A1 Oct. 1, 2009

(51) Int. Cl.
*F16K 11/00* (2006.01)
*F16K 11/14* (2006.01)

(52) U.S. Cl. ............................... 137/636.4; 137/625.17

(58) Field of Classification Search ............. 137/636.4, 137/625.17, 636, 625.25, 625.69, 625.23
See application file for complete search history.

(56) References Cited

U.S. PATENT DOCUMENTS 3,670,628 A 6/1972 Borer et al.
3,972,264 A * 8/1976 Field et al. ................ 91/358 A
4,300,594 A 11/1981 Bacardit
4,342,335 A 8/1982 Reinicker et al.
4,395,926 A 8/1983 Kubo et al.
4,471,805 A 9/1984 Solie et al.
4,539,862 A 9/1985 Caldwell
4,632,148 A 12/1986 Stark, Sr. et al.
4,722,262 A * 2/1988 Schneider .................... 91/447
4,738,315 A 4/1988 Kinzenbaw
4,874,006 A 10/1989 Iqbal
4,890,645 A 1/1990 Andersen
4,913,190 A * 4/1990 Kugler .................. 137/624.27
5,251,669 A 10/1993 Bishop
5,419,208 A 5/1995 Schick
5,934,320 A 8/1999 O'Reilly et al.
5,992,454 A * 11/1999 Schrag .................... 137/596.2
6,202,694 B1 3/2001 Gilbert et al.
6,237,464 B1 5/2001 Fraley, Jr. et al.
6,725,881 B1 4/2004 Beswick et al.
6,976,504 B2 * 12/2005 Courtright et al. ..... 137/624.27

* cited by examiner

*Primary Examiner*—Kevin L Lee

(57) ABSTRACT

A selectable detent assembly that has a housing with a plurality of passageways. Within the housing is a selector spool that is disposed within a selector passageway and is rotatable to provide a plurality of rotational positions including a no detent position, a kick down position, and a continuous detent position. A pilot check valve is disposed within the housing and provides a fluid flow path from a pilot passageway to the selector passageway and a detent passageway. A detent arming piston is disposed within the detent passageway and is connected to a directional control valve spool. Thus, depending on the rotational position of the selector spool, the selector spool can either provide a continuous flow path through the selector passageway to a tank, a flow path that is controlled by the axial position of the selector spool or prevent flow to the tank in order to operate the detent arming piston.

8 Claims, 9 Drawing Sheets

SELECTABLE DETENT ASSEMBLY WITH NEUTRAL PROTECTION

BACKGROUND OF THE INVENTION

This invention relates to hydraulically operated devices. More specifically, this invention relates to a mechanical actuated directional control valve applied in a mobile hydraulic circuit.

Selectable hydraulic detent type valves exist as taught in U.S. Pat. No. 6,976,504. These devices provide a plurality of rotational positions wherein each separate position provides separate flow paths and functioning of the assembly. These different rotational positions are often referred to as modes wherein a first position is considered a continuous detent or continuous mechanical detent position, a second position is a no detent position and a third position is known as a kick out or kick down position wherein axial movement of the assembly determines the fluid flow path within the hydraulic device.

While advantages associated with the detent mechanism exist several disadvantages remain. For example, deactivated detent pressure is not externally adjustable. There exists no mode switching with a mode integrated selector function. There is no low pressure logic control for the selector function. Finally, there is a need for an incorporated spool release to a neutral position with loss of system pressure.

Therefore, a principal object of the present invention is to provide an economically means to robustly achieve detent mode selection.

Yet another object of the present invention is to provide an improved selectable detent assembly that reduces axial thrust and complexity in achieving an actuating force.

Another object of the present invention is to minimize pressure and external leakage within the system.

These and other objects, advantages, or features of the invention will become apparent from the specification and claims.

BRIEF SUMMARY OF THE INVENTION

A flexible detent assembly having a housing with a selector passageway, a pilot passageway and a detent passageway disposed therein. A selector spool is disposed within the selector passageway and rotatable to provide a plurality of rotational positions. A pilot check valve is disposed within the housing and provides a fluid flow path from the pilot passageway to the selector passageway and the detent passageway. A detent arming piston is disposed within the detent passageway and is operatively connected to a directional control valve spool and is in fluid communication with the selector passageway. Therefore, depending upon the plurality of rotational positions of the selector spool, a plurality of fluid flow paths through the selectable detent assembly is provided.

DETAILED DESCRIPTION OF THE PREFERRED EMBODIMENT

Figure 1:
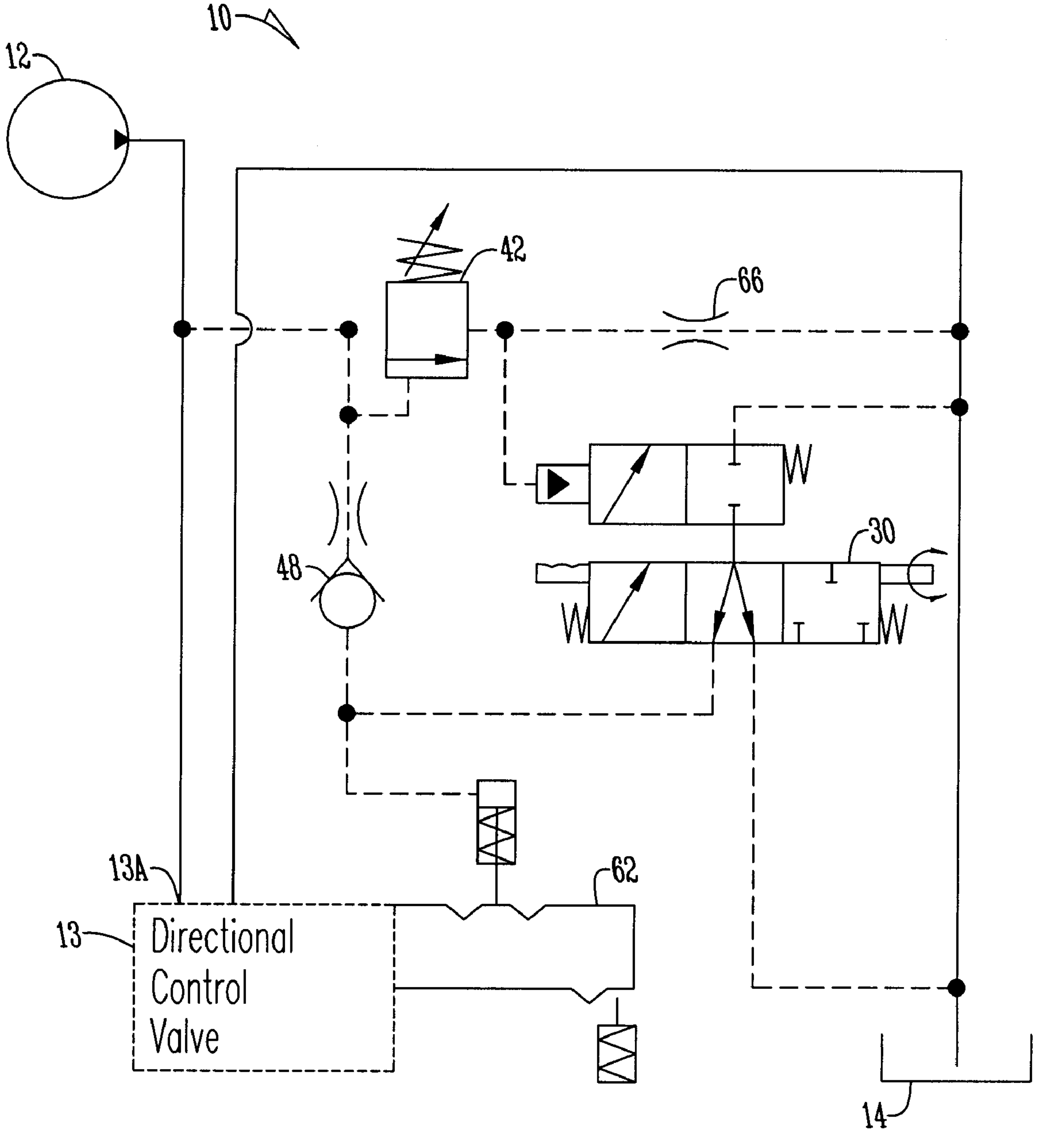
FIG. 1 is a schematic diagram of a selectable detent assembly.

The figures show a selectable detent assembly 10 that controls fluid flow from a pump 12 to a directional control valve 13 with inlet 13A and eventually into tank 14. The selectable detent assembly 10 comprises a housing 16 that houses a plurality of fluid passageways including a tank passageway 18, selector passageway 20, pilot passageway 22, detent passageway 24, housing passageway 26, and auxiliary passageway 28.

Figure 4:
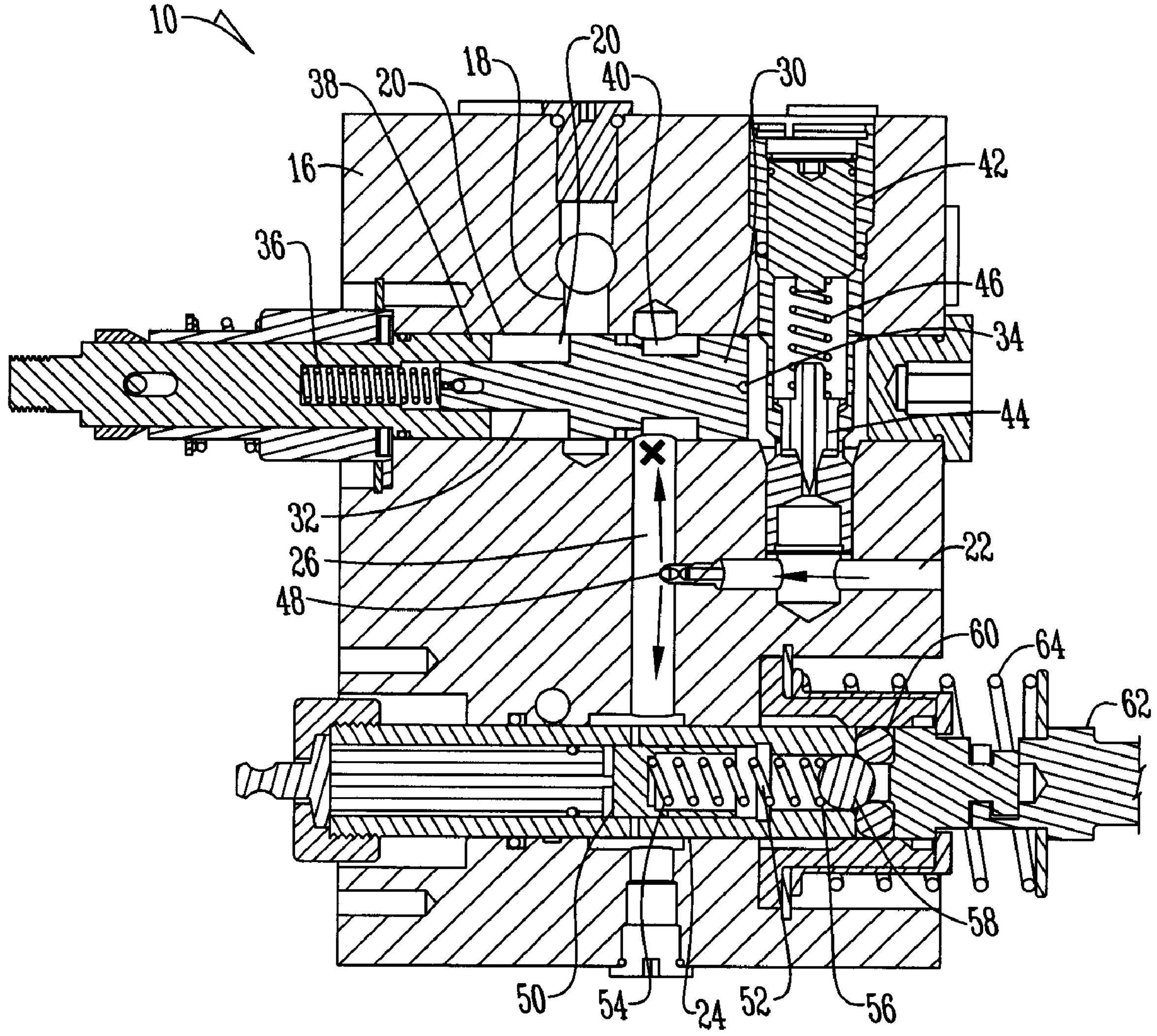
FIG. 4 is a sectional view of a selectable detent assembly in a kick down detent position.
Figure 4A:
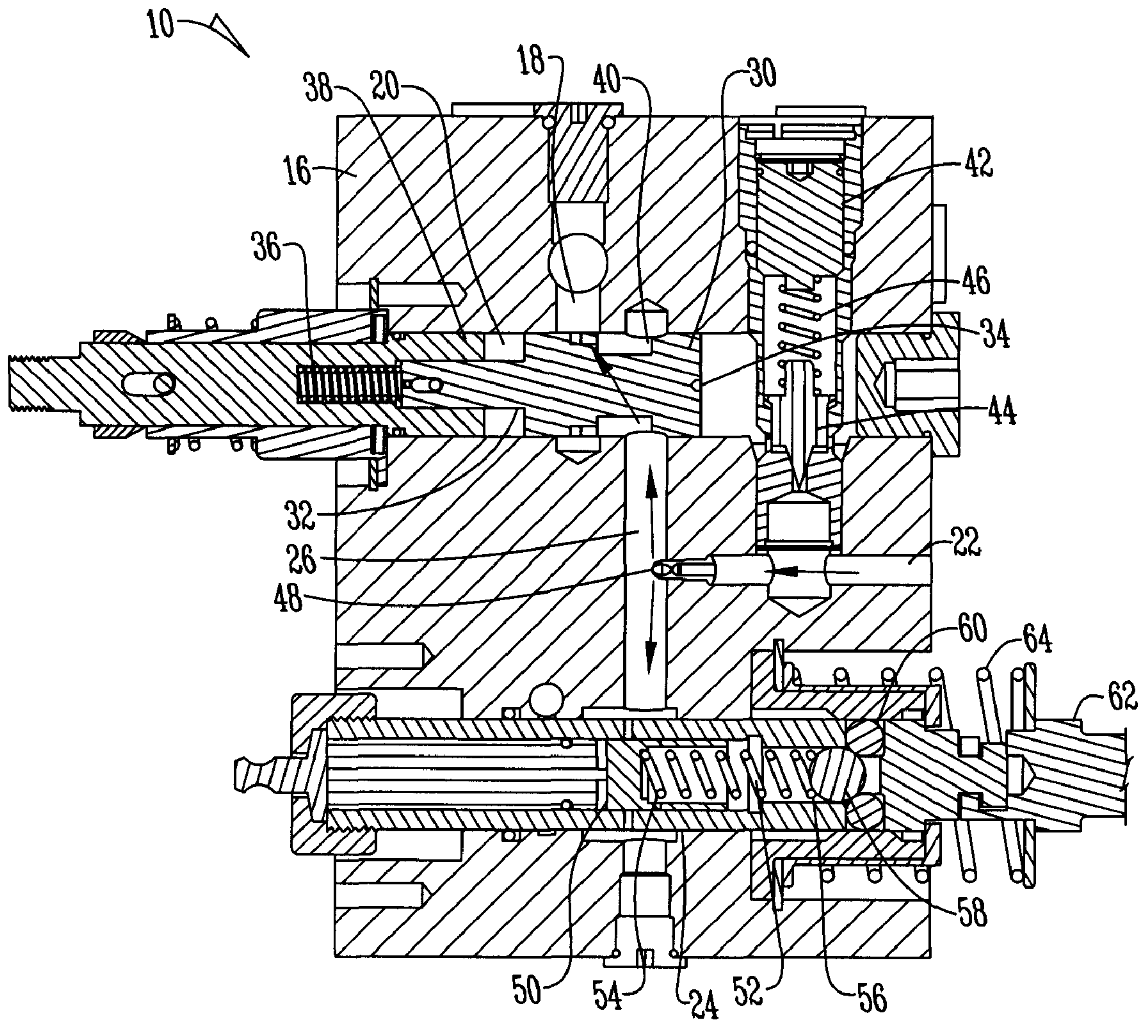
FIG. 4A is a sectional view of a selectable detent assembly in a kick down detent position.
Figure 5:
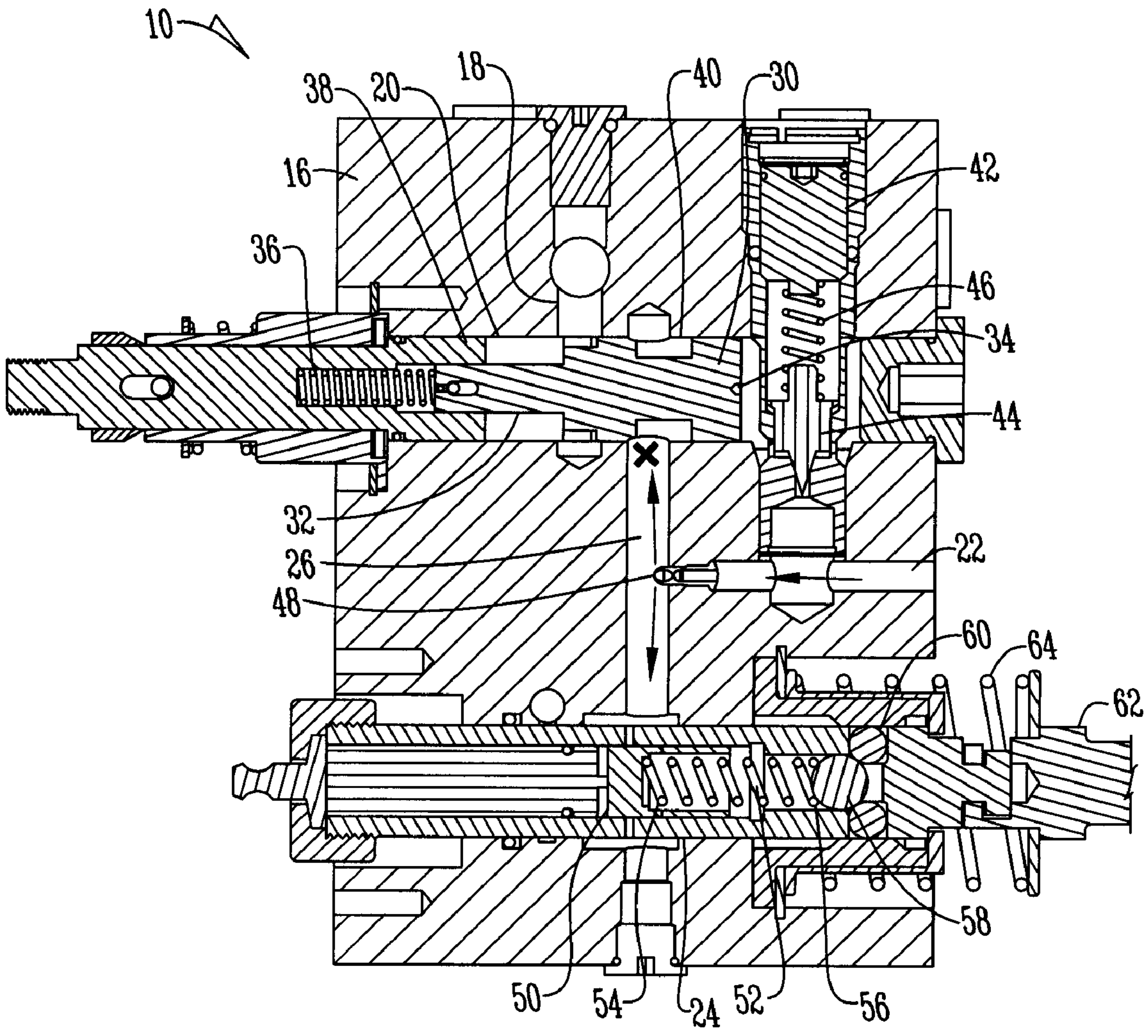
FIG. 5 is a sectional view of a selectable detent assembly in a continuous detent position.
Figure 5A:
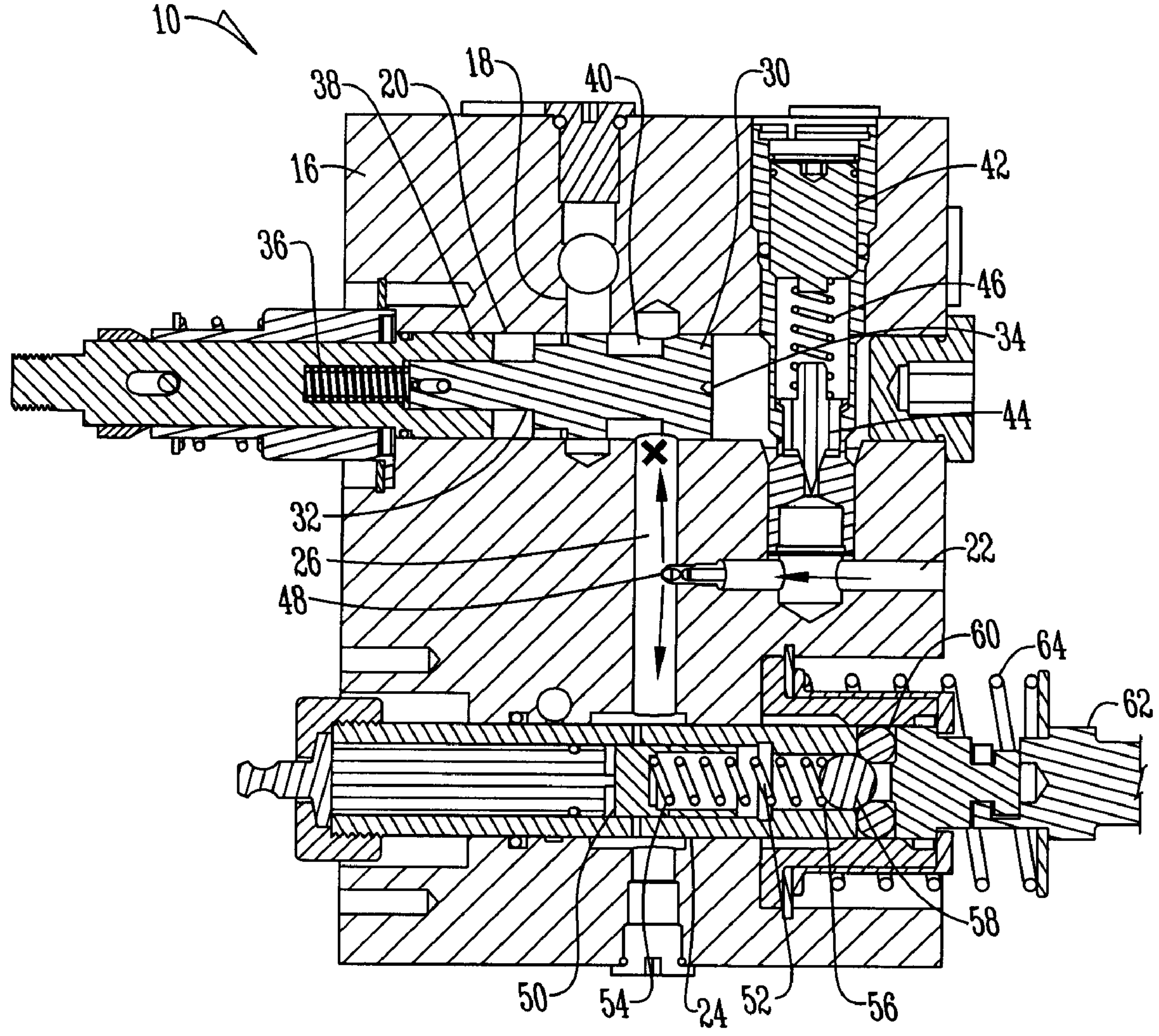
FIG. 5A is a sectional view of a selectable detent assembly in a continuous detent position.

Disposed within the selector passageway 20 is a selector spool 30 that extends from a first end 32 to a second end 34. The selector spool 30 is rotatable to provide three separate rotational positions including a no detent position (FIGS. 3, 3A), a kick down detent position (FIGS. 4, 4A) and a continuous detent position (FIGS. 5, 5A). Additionally, the selector spool 30 is also axially moveable wherein a biasing force caused by biasing spring 36 acting on selector shaft 38 acts on the first end 32 of the selector spool 30 to bias the spool in a first direction and pressure from pilot passageway 22 acting on the second end 34 of the selector spool 30 biases the selector spool 30 in a second direction. Additionally, the selector spool 30 has commutation slots 40 disposed therein that when properly aligned can provide a fluid flow path through the selector passageway 20 to the tank passageway 18 and thus onto tank 14.

A pilot relief valve 42 is disposed within the housing and provides a fluid flow path between the pilot passageway 22 and the second end 34 of the selector spool 30. Specifically, the pilot relief valve 42 has a actuating member that is biased by a pilot spring 46 to keep the pilot relief valve 42 in a closed position to prevent a fluid flow path from the pilot passageway 22 to the second end 34 of the selector spool 30. Once a threshold pressure is reached the actuating member 44 overcomes the biasing force of the pilot spring 46 to provide the fluid flow path between the pilot passageway 22 and the second end 34 of the selector spool 30 within the selector passageway 20.

Disposed within the pilot passageway 22 is a pilot check valve 48. The pilot check valve 48 is specifically positioned between the pilot passageway 22 and the housing passageway 26 such that when pressure within the pilot passageway 22 overcomes a threshold pressure the pilot check valve 48 opens to provide fluid flow into the housing passageway 26 which then diverts fluid to both the selector passageway 20 and the detent passageway 24. In a preferred embodiment the threshold pressure of the pilot check valve 48 is less than the threshold pressure of the pilot relief valve 42.

Within the detent passageway 24 is a detent arming piston 50. The detent arming piston 50 engages a detent biasing spring 52 at a first end 54 of the spring 52 wherein the second end 56 of the detent biasing spring 52 engages a detent center ball 58. The detent center ball 58 engages detent satellite balls 60 which in turn cause the mechanical detent holding force. Thus, pressure caused by fluid within the detent passageway 24 against the detent arming piston 50 prevents the main directional control spool valve 62 from returning to the center neutral position by means of the main directional control spool center spring 64.

Figure 2:
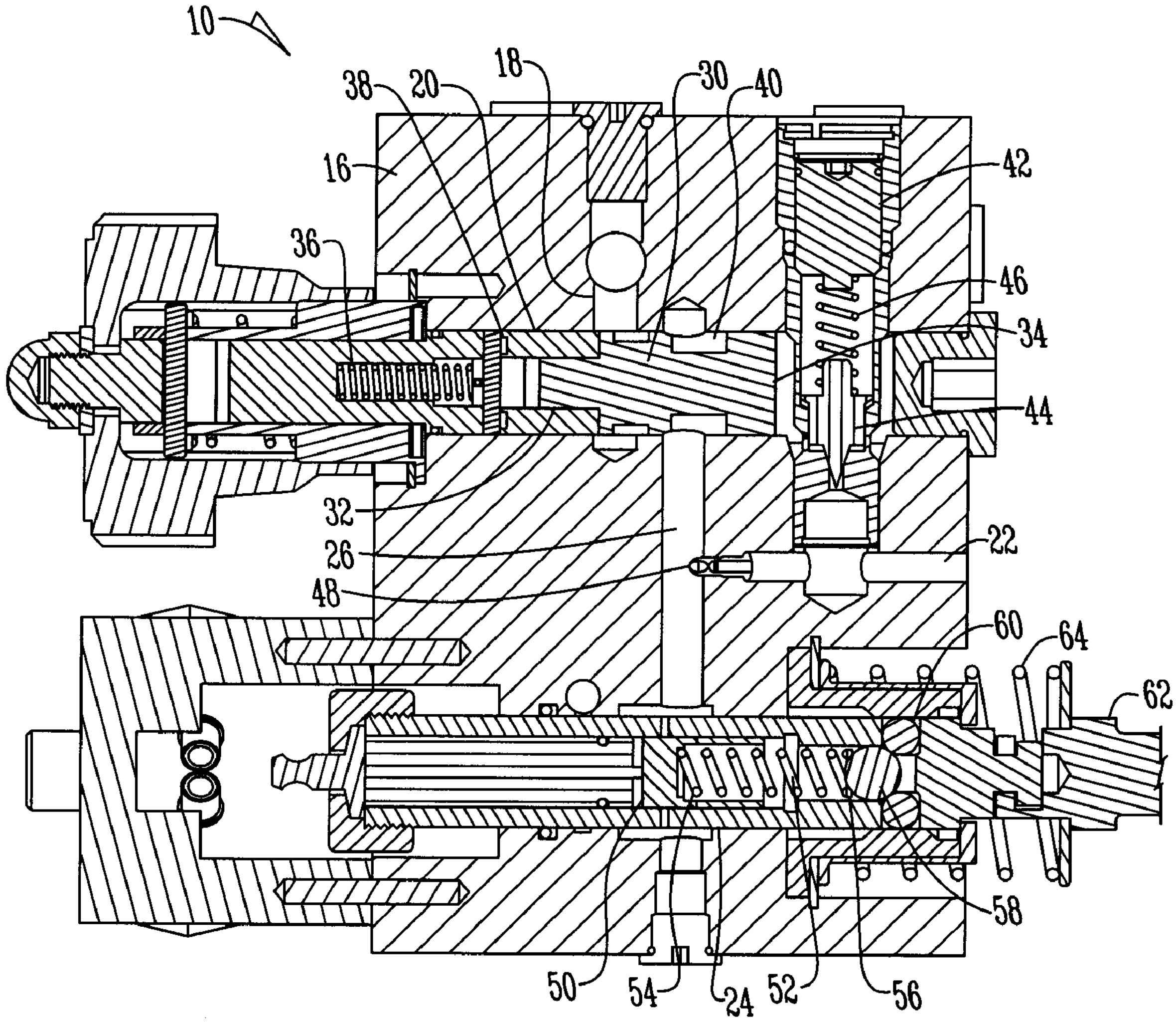
FIG. 2 is a sectional view of the selectable detent assembly.
Figure 2A:
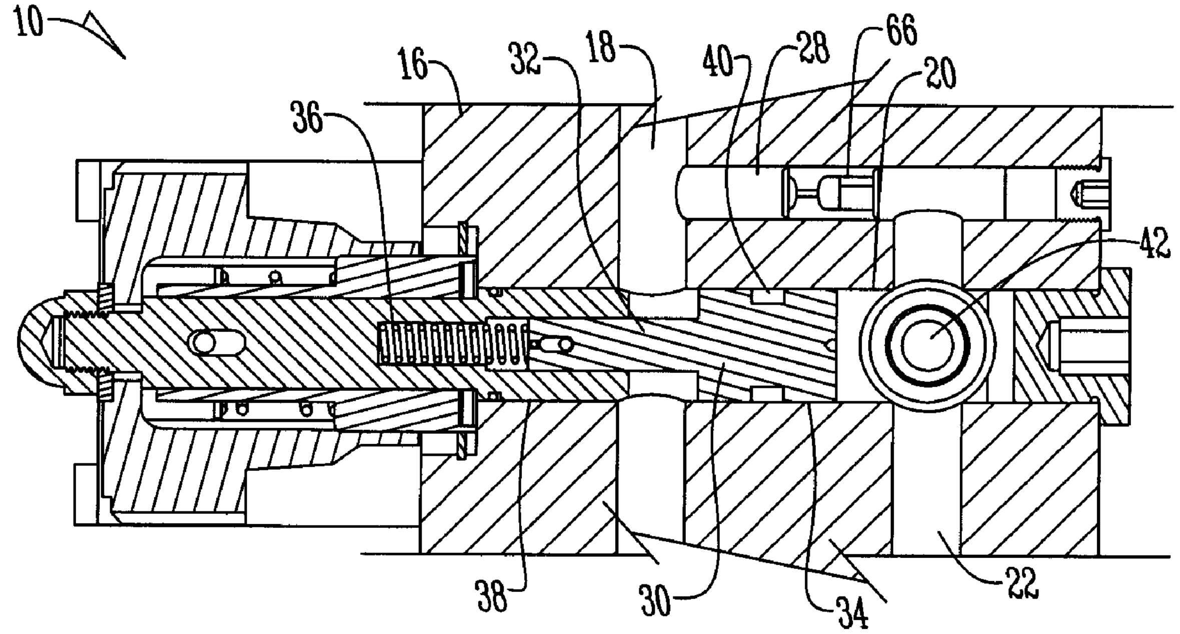
FIG. 2A is sectional view of a selectable detent assembly taken along the sectional lines 2A-2A.

The auxiliary passageway 28 as shown in FIG. 2A connects the pilot passageway 22 with the tank passageway 18 to convey fluid to the tank 14. An orifice 66 is located within the auxiliary passageway 28 in order to provide a restricted fluid flow through this auxiliary passageway 28.

Figure 3:
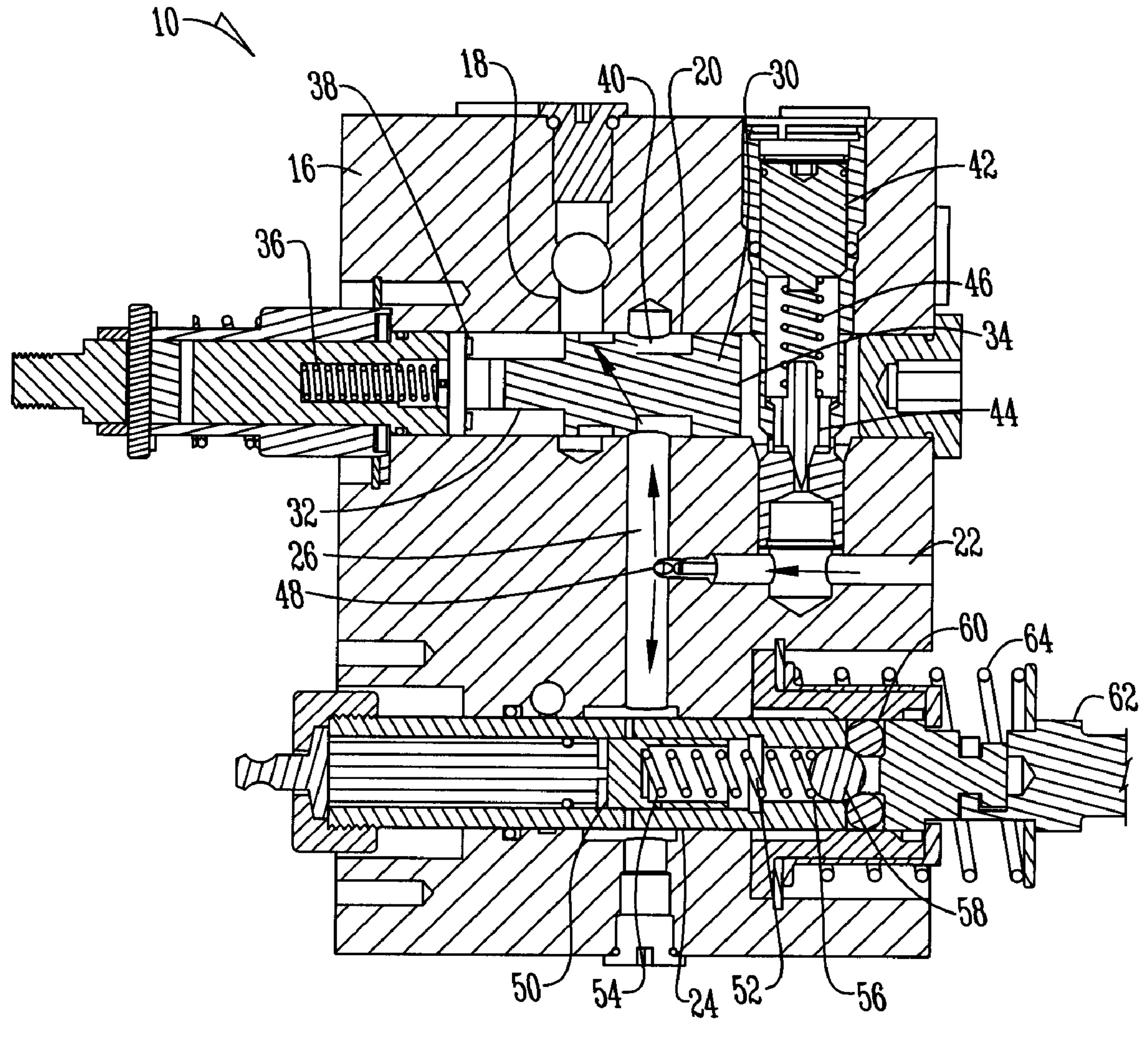
FIG. 3 is a sectional view of a selectable detent assembly in a no detent position.
Figure 3A:
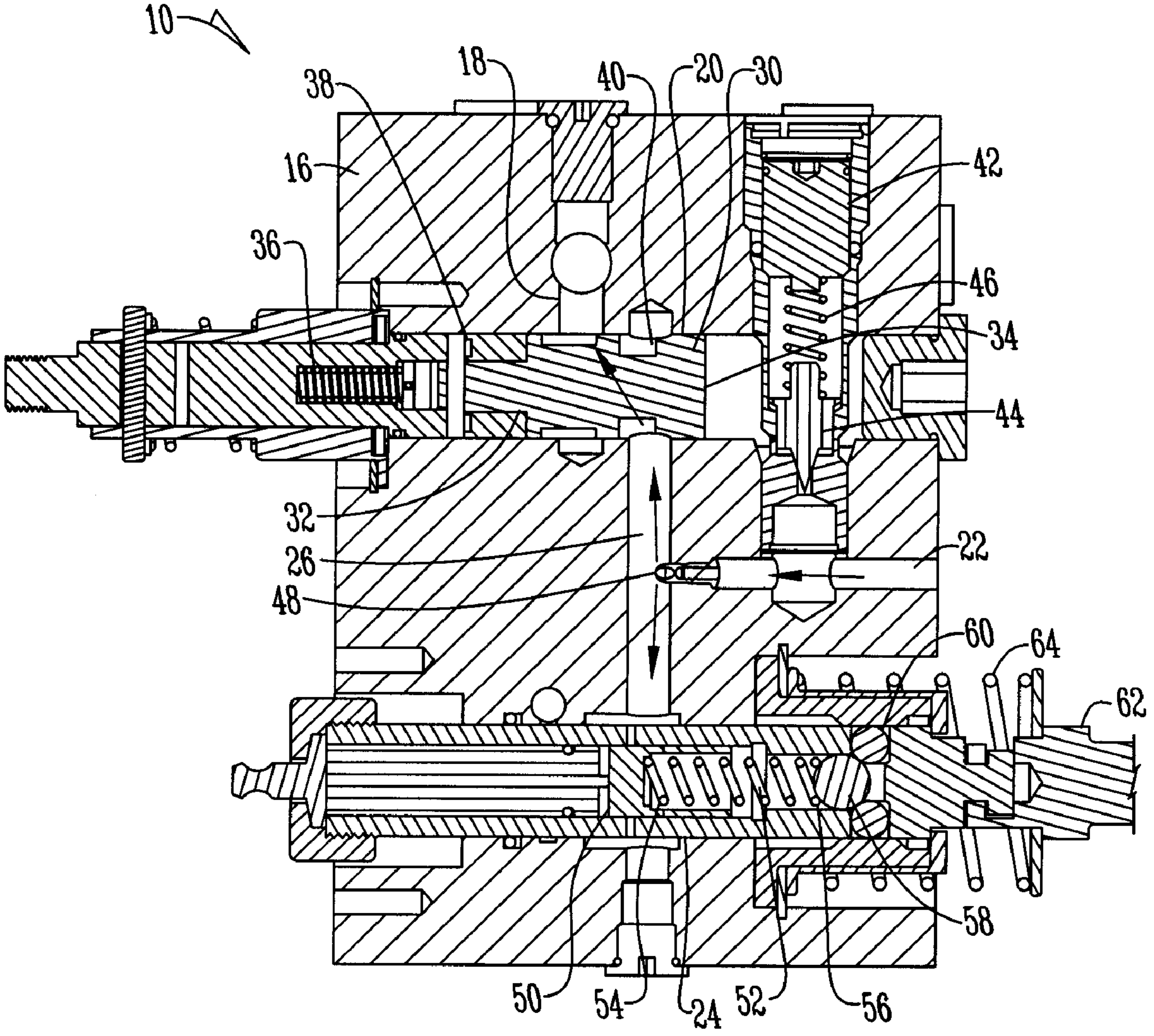
FIG. 3A is a sectional view of a selectable detent assembly in a no detent position.

In operation, the selector spool 30 has three distinct radial positions that are selected externally by an operator. The first position is referred to as a no detent position or a spring center radial position as shown in FIGS. 3 and 3A. The second position is known as a kick down detent position otherwise known as a 60 degree counterclockwise position. The final position is referred to as a continuous detent position or otherwise known as a 60 degree counterclockwise position. In relation to all of the radial positions the selector spool 30 also has two axial positions. The first axial position is considered a normal or neutral position wherein the force that is acting on the second end 34 of the selector spool 30 does not overcome the biasing force of biasing spring 36. The second position is considered the shift position and this is the position where the fluid force on the second end 34 of the selector spool 30 overcomes the biasing force of the biasing spring 36.

When the selector spool 30 is in its no detent radial position and is in its neutral or normal axial position commutator slots 40 are aligned to direct flow to the tank passageway 18. Additionally, as shown in FIG. 3A when in the no detent rotational position, even when the selector spool 30 is axially in its shifted position the commutator slots 40 still allow fluid flow through the selector passageway 20 to the tank passageway 18. Thus, as fluid flows through the pilot check valve 48 regardless of the axial position of the selector spool 30 the fluid flows through the selector passageway 20 into the tank 14 thus preventing the detent arming piston 50 from compressing the detent biasing spring 52 and allowing the main directional control spool 62 to return to the center neutral position by means of the main directional control spool center spring 64.

Specifically, in the no detent radial position the commutator slots 40 align to continuously drain the pilot supply flow to the tank 14 under all operating conditions. This occurs at a pressure level that is lower than the pressure required for the detent arming piston 50 to be activated against the detent biasing spring 52. The pilot flow is limited by an orifice restriction created by the pilot check valve 48. In this condition the axial movement of the directional control valve spool 62 can be positioned by the operator into the in or out axial position and it returns to a normal center position via the main spool centering spring 64. A normal center position is the position that the directional control spool valve 62 is in when no pressure overcomes the biasing force of the main spool centering spring 64.

The next rotational position is the kick down detent position. In this position the selector spool 30 aligns the commutator slots 40 to block the pilot flow directed to the selector spool 30 when the pilot pressure is less than the pilot relief valve pressure setting of pilot relief valve 42.

In the kick down detent position or kick down mode when the inlet pressure of the directional control valve 13 achieves a pressure level that is sufficient to move the arming piston 50, the arming piston 50 moves to a position limiting and compressing the detent biasing spring 52. The compressed detent biasing spring 52 creates a predetermined force acting against the detent center ball 58 which in turns creates a radial force on the detent satellite balls 60. In this condition the directional control valve spool 62 can be positioned by the operator into the in or out full axial position wherein the spool is mechanically constrained from returning to the normal spring center position by the detent holding force.

When the pressure level of the directional control valve inlet 13A exceeds the pressure level of the pilot relief valve setting of pilot relief valve 42 the pilot pressure path to the pilot relief valve 42 is directed across the pilot relief valve 42 into two parallel paths. The first path is a flow path connected to the directional control valve tank 14. The pilot oil flow to the tank 14 is regulated by orifice 66. The second path is the flow path connected to the selector passageway 20 against the second end 34 of selector spool 30 opposite the selector spool biasing spring 36. The pilot oil flow creates a pressure drop across the orifice 66 which creates pressure in the selector passageway 20 which causes the selector spool 30 to shift against the biased spring 36 to a predetermined position controlled by the selector shaft 38.

In the shifted position the pilot oil in the paths directed to the selector spool 30 and detent arming piston 50 are directed across the selector spool 30 to the directional control valve tank 14 at low pressure. The pressure in the detent passageway 24 decreases to a level that allows the detent biasing spring 52 to return the selector spool 30 to the normal position. This reduces the spring generated force on the center detent ball 58 which reduces the radial force acting on the detent satellite balls 60. Therefore, the directional control valve spool 62 is returned to the normal center position via the main spool centering spring 64. When this happens the directional control valve inlet pressure decreases to a level less than the pilot relief valve 42 as the pressure setting in the pilot relief valve 42 resets. In this condition the pilot oil path to the pilot relief valve 42 is blocked and the pressure within the selector passageway 20 decreases to a level that allows the selector spool biased spring 36 to shift the selector spool 30 to the normal position. Consequently, the detent circuit is automatically reset for another cycle.

In the final rotational position which is considered the continuous detent position as best shown if FIGS. 5 and 5A the selector spool 30 aligns the commutator slots 40 to block the pilot flow to the selector spool 30 in all operating conditions. In the continuous detent position or mode within the selector spool 30 the pressure level of the pilot oil is not directed to the directional control tank 14 when the pressure level increases to exceed the pressure setting of the pilot relief valve 42. The directional control valve spool 62 is thus mechanically constrained from returning to the normal spring center position by the detent holding force and does not return to the normal center position until the operator manually shifts the spool out of the detent position.

When the spool action mode is in either the kick down or continuous mode and therein occurs an intentional loss of system pressure in the directional control valve circuit the pressure in the detent passageway 24 decreases to a level that allows the detent biasing spring 52 to return the detent arming piston 50 to a normal position. This reduces the spring generated force on the detent center ball 58 which thus reduces the radial force acting on the detent satellite balls 60. The directional control valve spool 62 is returned to the normal center position via the main spool centering spring 64.

This feature prevents the possibility of unintentional movement of any actuators that are controlled by the directional control valve 13 upon the reactivation of system pressure. In the event of an unintentional transient loss of pilot oil from the directional control valve 13 the pilot check valve 48 prevents reverse flow of pilot oil from the selector spool 30 or detent arming piston 50. This prevents an unauthorized kick down of the detent during the duration of the transit pressure loss.

Thus, provided is a selectable detent that operates with hydraulic oil supplied from the inlet 13A of the directional control valve 13 which controls a mechanical detent. When there is no hydraulic oil supplied to the directional control valve 13 there is no pilot oil supplied to the detent circuit. When there is hydraulic oil supplied to the directional control valve 13 and with the valve in the neutral position the pilot oil supplied to the detent circuit is equal to the directional control valve inlet to tank pressure delta. The rated maximum pilot supplied pressure is equal to the directional control valve rated system pressure.

Thus, provided is a selectable detent assembly that provides an economical means to robustly achieve a selectable directional control valve spool position mode to include a continuous mechanical detent for holding the control valve spool in power positions, a no detent mode for allowing the control valve spool to spring return to center neutral position, and a kick down detent for holding the control valve spool in operating positions and pressure deactivating for spring return to center neutral position. Unique characteristics of the assembly 10 include an external adjustment for pressure limit of pressure detent deactivation, mode switching with the mode integrated selector function, low pressure logic control for selector function and an incorporated spool release to neutral position with loss of system pressure. Thus, at the very least all of the stated objectives have been met.

It will be appreciated by those skilled in the art that other various modifications could be made to the device without departing from the spirit in scope of this invention. All such modifications and changes fall within the scope of the claims and are intended to be covered thereby.

What is claimed is:

1. A selectable detent assembly comprising:

a housing having a selector passageway, a pilot passageway and a detent passageway disposed therein;

a selector spool disposed within the selector passageway and rotatable to provide a plurality of rotational positions;

a pilot check valve disposed within the housing and providing a fluid flow path from the pilot passageway to the selector passageway and the detent passageway;

a detent arming piston disposed within the detent passageway, operatively connected to a directional control valve spool and in fluid communication with the selector passageway; and wherein in a plurality of rotational positions of the selector spool provide a plurality of fluid flow paths through the selectable detent assembly.

2. The selectable detent assembly of claim 1 wherein in a first rotation position the selector spool provides a continuous fluid flow path through the selector passageway to a tank.

3. The selectable detent assembly of claim 2 wherein in a second rotational position the selector spool is axially movable from a first axial position that provides a fluid flow path through the selector passageway to the tank and a second axial position that prevents fluid flow through the detent passageway to the tank.

4. The selectable detent assembly of claim 3 wherein in a third rotational position the selector spool prevents fluid flow through the detent passageway to the tank.

5. The selectable detent assembly of claim 1 further comprising a pilot relief valve disposed within the housing and providing a second fluid flow path from the pilot passageway to the selector passageway.

6. The selectable detent assembly of claim 1 further comprising a selector spool bias spring engaging a selector shaft to bias the selector spool axially.

7. The selectable detent assembly of claim 1 wherein the operative connection between the detent arming piston and the directional control valve spool comprises a detent biasing spring engaging the detent arming piston at a first end and a detent center ball at a second end and wherein the detent center ball engages detent satellite balls that engage the directional control spool valve.

8. The selectable detent assembly of claim 1 wherein an orifice is disposed in an auxiliary passageway disposed between the pilot passageway and a tank to regulate the flow of fluid from the pilot passageway to the tank.

* * * * *

UNITED STATES PATENT AND TRADEMARK OFFICE

CERTIFICATE OF CORRECTION

PATENT NO. : 7,857,003 B2
APPLICATION NO. : 12/056476
DATED : December 28, 2010
INVENTOR(S) : Ronald D. Groen et al.

It is certified that error appears in the above-identified patent and that said Letters Patent is hereby corrected as shown below:

Title page, column 1, line 9 of inid code (73), Assignee: delete "Sauder-Danfoss Inc." and insert --Sauer-Danfoss Inc.--

Signed and Sealed this
Twenty-second Day of February, 2011

David J. Kappos
*Director of the United States Patent and Trademark Office*